United States Patent
Tedesco et al.

(10) Patent No.: US 6,282,523 B1
(45) Date of Patent: Aug. 28, 2001

(54) METHOD AND APPARATUS FOR PROCESSING CHECKS TO RESERVE FUNDS

(75) Inventors: Daniel E. Tedesco, New Canaan; James A. Jorasch, Stamford, both of CT (US)

(73) Assignee: Walker Digital, LLC, Stamford, CT (US)

(*) Notice: Subject to any disclaimer, the term of this patent is extended or adjusted under 35 U.S.C. 154(b) by 0 days.

(21) Appl. No.: 09/106,888

(22) Filed: Jun. 29, 1998

(51) Int. Cl.[7] .................................................. G06F 17/60
(52) U.S. Cl. ........................ 705/45; 705/42; 705/44; 705/33; 705/39; 705/1; 235/379
(58) Field of Search ............................ 705/1, 33, 39, 705/42, 44, 45; 235/379

(56) References Cited

U.S. PATENT DOCUMENTS

| | | | |
|---|---|---|---|
| 3,611,292 | 10/1971 | Brown et al. ........................ | 235/380 |
| 3,617,638 | 11/1971 | Jochimsen et al. ............... | 379/91.01 |
| 3,697,693 | 10/1972 | Deschenes et al. ..................... | 705/38 |
| 3,950,013 | 4/1976 | Tagliaferri ............................ | 283/100 |
| 3,950,015 | 4/1976 | Shrock ................................... | 283/70 |
| 4,053,735 | * 10/1977 | Foudos ................................... | 705/41 |
| 4,264,808 | 4/1981 | Owens et al. .......................... | 705/30 |
| 4,299,073 | 11/1981 | Golicz et al. .......................... | 53/493 |
| 4,321,672 | 3/1982 | Braun et al. ........................... | 705/42 |
| 4,341,951 | 7/1982 | Benton .................................... | 705/41 |
| 4,385,285 | * 5/1983 | Horst et al. ........................... | 382/119 |
| 4,630,201 | 12/1986 | White . | |
| 4,672,377 | 6/1987 | Murphy et al. ................. | 340/825.34 |
| 4,683,536 | 7/1987 | Yamamoto ............................. | 705/17 |
| 4,837,422 | 6/1989 | Dethloff et al. ..................... | 235/380 |
| 4,870,596 | 9/1989 | Smith ............................... | 364/479.05 |
| 4,882,675 | 11/1989 | Nichtberger et al. .................. | 705/14 |
| 4,948,174 | 8/1990 | Thomson et al. . | |
| 4,997,188 | 3/1991 | Nilssen .................................. | 705/14 |

(List continued on next page.)

FOREIGN PATENT DOCUMENTS 8-212268A * 8/1996 (JP).

OTHER PUBLICATIONS

Dictionary of Finance and Investment Terms, Fourth Edition, Downes and Goodman, Barron's Educational Series, 1995.*

PCT International Search Report for International Application No. PCT/US99/14571 mailed Oct. 22, 1999.

(List continued on next page.)

*Primary Examiner*—Vincent Millin
*Assistant Examiner*—Nicholas David Rosen
(74) *Attorney, Agent, or Firm*—Dean P. Alderucci

(57) ABSTRACT

A bank device communicates with an account holder device, such as a telephone or computer operated by the account holder. The bank device receives therefrom check data that includes an account identifier, a check identifier, and an amount of funds. The account identifier indicates a financial account and the check identifier indicates a check drawn on the financial account. The amount of funds represents an amount to reserve for payment with the check. The bank device in turn makes the amount of funds unavailable for use in the financial account so the account holder may not withdraw or otherwise remove the amount of funds. The bank device generates a code that indicates the check, and transmits the code to the account holder device. Subsequently, a payee, such as a merchant presented with the specified check, may verify that the check does indeed have an amount of funds reserved for payment therewith. The bank device receives the code from the payee, and determines the amount of funds that are reserved for payment with the check. An appropriate message that indicates the reserved amount of funds is transmitted to the payee.

35 Claims, 13 Drawing Sheets

U.S. PATENT DOCUMENTS

| | | | |
|---|---|---|---|
| 5,010,485 | | 4/1991 | Bigari ................................... 705/17 |
| 5,023,782 | | 6/1991 | Lutz et al. ............................ 705/45 |
| 5,144,630 | | 9/1992 | Lin ........................................ 372/22 |
| 5,176,224 | | 1/1993 | Spector ................................. 186/52 |
| 5,393,963 | | 2/1995 | Thomas et al. ....................... 705/45 |
| 5,426,281 | | 6/1995 | Abecassis . |
| 5,432,506 | * | 7/1995 | Chapman .............................. 705/44 |
| 5,442,162 | | 8/1995 | Armel ................................... 235/381 |
| 5,491,325 | * | 2/1996 | Huang et al. .......................... 705/45 |
| 5,557,518 | | 9/1996 | Rosen .................................... 380/24 |
| 5,570,465 | | 10/1996 | Tsakanikas ........................... 395/114 |
| 5,594,226 | | 1/1997 | Steger . |
| 5,679,940 | | 10/1997 | Templeton et al. .................. 235/380 |
| 5,703,344 | | 12/1997 | Bezy et al. . |
| 5,754,653 | * | 5/1998 | Canfield ................................ 705/75 |
| 5,832,463 | * | 11/1998 | Funk ...................................... 705/35 |
| 5,864,830 | * | 1/1999 | Armetta et al. ....................... 705/41 |
| 5,890,141 | * | 5/1999 | Carney et al. ......................... 705/45 |
| 5,903,881 | * | 5/1999 | Schrader et al. ...................... 705/42 |
| 5,925,865 | * | 7/1999 | Steger ................................... 235/379 |
| 5,953,710 | * | 9/1999 | Fleming ................................ 705/38 |
| 6,012,637 | * | 1/2000 | Hirokawa et al. ................... 235/380 |
| 6,014,650 | * | 1/2000 | Zampese ............................... 705/44 |
| 6,021,943 | * | 2/2000 | Chastain ............................... 235/379 |
| 6,023,682 | * | 2/2000 | Checchio .............................. 705/18 |
| 6,036,344 | * | 3/2000 | Goldenberg ........................... 705/39 |
| 6,041,315 | * | 3/2000 | Pollin .................................... 705/45 |
| 6,052,675 | * | 4/2000 | Checchio .............................. 705/44 |
| 6,059,185 | * | 5/2000 | Funk et al. ............................ 235/379 |
| 6,073,121 | * | 6/2000 | Ramzy .................................. 705/45 |
| 6,081,792 | * | 6/2000 | Cucinotta et al. .................... 705/43 |
| 6,164,528 | * | 12/2000 | Hills et al. ............................ 235/379 |

OTHER PUBLICATIONS

Jeffrey Kutler, Citicorp Travelers Checks Will Feature Mail Delivery with Signature Imprint, The American Banker, Jul. 18, 1980 at p. 1.

"ATMs and Traveler's Checks: Worthwhile for Bankers?", ABA Banking Journal, Jan. 1981 at p. 82.

"Amex Offers Checques on Call", Bank Letter, Jul. 29, 1991 at p. 8

Karen Gullo, "ATMs to Dispense Travelers Checks", The Associated Press, May 31, 1994.

"Business Digest International Insurance . . . ", The Courier–Journal, Jun. 1, 1994 at p. 8B.

Karen Epper, "Amex to Sell Checks Through ATMs", The American Banker, Jun. 1, 1994 at p. 16.

"American Express Travellers Checques Available Over Telephone", Canada Newswire, Feb. 14, 1996.

Nikhil Deogun, "New ATMs Can Do It All", The Orange County Register, Jun. 6, 1996 at p. C04.

Nikhil Deogun, "Newest ATM's Dispense a Variety of Items", The Houston Chronicle, Jun. 10, 1996 at p. 5.

Michelle Singletary, :Banks Branch Out Over the Phone, The Washington Post, Jun. 21, 1996 at p. D01.

David O. Tyson, "American Express to Install USSR's First ATMs", The American Banker, Jun. 17, 1988 at p. 7.

Susan Zimmerman, "ATM's, Direct–debit Systems More . . . ", Supermarket News, May 6, 1985 at p. 48.

Eva Tahmincioglu, "Retailers Seek to Take the Risks Out of Checks", WWD, Aug. 23, 1990 at p. 7.

Stephen J. Ebert, "Stop Counterfeits; Check Validation System", Corporate Cashflow Magazine, Jan. 1991 at p. 32.

Doug Abrams, "Little Bank, Big World; On–line Customers Form All Over Use Kentucky Branch", The Washington Times, Jun. 7, 1996 at p. B7.

Brochure: "Take Checks? Trust SCAN", Shared Cash Authorization Network, Copyright 1997.

Esther Surden, "Checks Shifting From Paper to Pulse", RIS News, Apr. 1998 at p. 12.

"Special Services", Dime Savings Bank (http://206.222.26.211/special.htm), Jun. 1, 1997.

"MerchantCards.Net Checkguarantee", CyberSanurai Marketing (http://www.merchantcards.net/check.htm) download date: May 6, 1998.

"CrossCheck", Crosscheck Co. (http://www.cross–check-.com/company.htm), download date: May 6, 1998.

"Quick–Checks . . . Check Guarantee Services", Quick–Checks Co. (http://www.quick–checks–payment.com/garantee.htm), download date: May 6, 1998.

* cited by examiner

| CODE 412 | ACCOUNT IDENTIFIER 414 | CHECK IDENTIFIER 416 | AMOUNT OF FUNDS 418 | EXPIRATION DATE 420 | PRESENTMENT PERIOD 422 | PAYEE 424 | TIME CODE GENERATED 426 | CLAIMED? 428 | CASHED? 430 |
|---|---|---|---|---|---|---|---|---|---|
| 982768 | 123456789 | 117 | $100 | 9/1/99 | 5/17/99 | - | 5/13/99 5:00 PM | NO | 5/19/99 12:30 PM |
| 1386511 042792 | 876123983 | 398 | $95 | 6/4/99 | FROM 5/3/99 TO 5/5/99 | - | 5/1/99 8:17 AM | 5/4/99 10:00 AM | NO |
| 11134587 0426703 | 123456789 | 120 | $85 | 9/3/99 | 5/18/99 FROM 8:00 AM TO 8:15AM | ACME | 4/28/99 12:53 PM | NO | NO |
| 0810670969 | 112248938 | 36 | $132 | 7/20/99 | - | 90043 | 4/29/99 8:19PM | NO | 6/20/99 8:00 AM |
| 1234612 8982001 | 123456789 | 121 | $19 | 9/3/99 | - | - | 2/12/99 2:45 PM | 6/14/99 11:30 PM | 6/17/99 11:10 AM |

METHOD AND APPARATUS FOR PROCESSING CHECKS TO RESERVE FUNDS

CROSS-REFERENCE TO RELATED APPLICATIONS

This application is related to commonly-owned, co-pending U.S. patent application Ser. No. 08/811,703 entitled "USER-GENERATED TRAVELER'S CHECKS" CHECKS" filed in the name of Jay S. Walker et al. on Mar. 5, 1997."

FIELD OF THE INVENTION

The present invention relates to methods and apparatus for processing checks drawn on a financial account.

BACKGROUND OF THE INVENTION

Personal checks are used by many people that are not able or willing to pay by other means, such as with currency. Unfortunately, many people are unwilling to accept personal checks because of the possibility that the check will not clear and thus payment will not be received. For example, the check may be written for an amount that exceeds the available balance of the financial account on which the check is drawn. The check may also be drawn on a financial account that has been closed or is otherwise inactive. Consequently, many people who would like to pay using a personal check are not allowed to do so, even if their check would clear.

U.S. Pat. No. 5,703,344 to Bezy et al. describes a real-time point-of-transaction funds confirmation system in which a draft presented by a payor to a payee is confirmed against the account on which the draft is drawn. A bank number and account number are printed on the face of the draft in a machine-readable format, usually in the form of a line of magnetic ink computer readable digits and punctuation (a "MICR line").

In the system of the '344 patent, the merchant scans the MICR line of the draft using a MICR line reader, and enters the amount of the draft manually or automatically via a cash register. A request record is generated therefrom and transmitted to a payor bank. The payor bank in turn secures a hold on funds from the account or generates an effective hold, and returns a response record to the merchant. Following receipt of the response record, the merchant accepts or rejects the transaction. The prudent merchant will reject a rejected transaction at this point or request other security. A hold is removed when a draft corresponding to the hold is presented for clearing.

The system described by the '344 patent suffers from several drawbacks. The real-time system verifies whether there are insufficient funds at the time of the transaction. Unfortunately, many people do not know precisely how much funds they have available in their account. Such people can be embarrassed at the time of the transaction to find that their draft is not accepted due to insufficient funds.

The above-referenced system requires specialized apparatus, such as the MICR line reader. The requirement for specialized apparatus limits the number of merchants that may perform the above-described process of the '344 patent to those that are willing and able to purchase and install such apparatus. In addition, the apparatus may break or otherwise fail to operate properly.

Another drawback of the system of the '344 patent is that the payee controls the amount of funds which are secured. This may not always be desirable, especially when the payee is not a trusted merchant. For example, a payor may wish to conduct a single transaction with a party he has never met, such as someone selling goods by telephone or on the Internet.

Furthermore, the system of the '344 patent secures a hold on funds at the time of the transaction. Such a limitation is not desirable for transactions that do not occur in "real time", such as checks that are mailed to a payee.

Another drawback is that an unscrupulous party may unilaterally secure any amount of funds if he has possession of stolen drafts. Such a party may secure an amount of funds equal to the entire available balance of the financial account.

U.S. Pat. No. 4,630,201 to White describes a system utilizing a smart card and a portable transaction device. The smart card stores an account number, account balance and secret password. The portable transaction device allows checks to be written against the balance stored on the smart card, and can be used to receive money transfers from the bank into the account balance stored in the card. Transactions can thus be carried out in an off-line manner and be subject to later verification at a central processing unit of the bank. However, the transaction device requires an on-line connection when funds are transferred from the bank to replenish the account balance in the card.

A central processor of the bank generates a table of random numbers which are associated with a sequence of transaction numbers. The sequence of transaction numbers are equivalent to successive check numbers. The set of random numbers and the associated check numbers are supplied to storage means at the portable transaction device.

When a check is to be written, the customer enters into the transaction device a parameter associated with the transaction, preferably the transaction amount. If the amount in the stored account balance is sufficient to cover the check, the account balance is debited and the transaction allowed to proceed. However, if the account balance is insufficient, the transaction will be halted. The customer will be required to transfer funds from his bank account to the card in an on-line manner.

The transaction device determines the random number associated with the next available check number and combines data representative of that random number with the transaction amount using an algorithmic encryption technique. The resulting output defines a security code which is associated with the check. The security code can be printed on the check.

When the check reaches the bank, its authenticity is verified by the central processor. If so, the transaction can be authorized and the check paid. The merchant may verify the authenticity and value of the check at the time it is presented. The bank can immediately verify the security code for the merchant thereby guaranteeing the check.

The system described by the '201 patent suffer from several drawbacks. Since the system is for writing checks drawn on a balance stored in a smart card, it is inapplicable to normal checking accounts, which are more widely used than smart cards. By one estimate, checks accounted for approximately 62 trillion transactions in 1995 alone, and half of all households in the U.S. use checks. The system of the '201 patent also requires specialized hardware, including the smart card and the portable transaction device. Such a requirement has hindered the acceptance of smart cards.

Furthermore, since smart cards store an account balance, even the most secure smart cards are susceptible to fraud and tampering, especially by skilled hardware and cryptography practitioners. For example, as described in an article entitled "Code Breaker Cracks Smart Cards' Digital Safe" on page 1 of The New York Times, Jun. 22, 1998, a four-man consulting firm has employed personal computers and several thousand dollars of electronics equipment to crack the latest versions of smart cards. Through tampering, the card balance could be increased. Worse, the balance could be increased and many checks could be written, each for the entire stored balance. The '201 patent does not describe a manner to protect against such a security compromise, nor does it describe a manner to permit merchants to verify that checks remain guaranteed after such a compromise in security. It is undesirable for a bank to be isolated from transactions since they are then unable to maintain security over the financial data of their accounts. Another drawback of smart cards in general is that they may be lost or damaged, preventing the stored balance from being used.

It would be advantageous to provide a method and apparatus for processing checks that reduced or eliminated some of the above-described drawbacks.

SUMMARY OF THE INVENTION

It is an object of the present invention to provide a method and apparatus that reduces the hesitancy to receive checks.

In accordance with the present invention, a bank device communicates with an account holder device, such as a telephone or computer operated by the account holder. The bank device receives therefrom check data that includes an account identifier, a check identifier, and an amount of funds. The account identifier indicates a financial account and the check identifier indicates a check drawn on the financial account. The amount of funds represents an amount to reserve for payment with the check. The bank device in turn makes the amount of funds unavailable for use in the financial account so the account holder may not withdraw or otherwise remove the amount of funds. The bank device generates a code that indicates the check, and transmits the code to the account holder device.

Subsequently, a payee, such as a merchant presented with the specified check, may verify that the check does indeed have an amount of funds reserved for payment therewith by contacting the bank device using a payee device. The bank device receives the code from the payee, and determines the amount of funds that are reserved for payment with the check. An appropriate message that indicates the reserved amount of funds is transmitted to the payee.

BRIEF DESCRIPTION OF THE DRAWINGS

FIG. 4 is a schematic illustration a reserved checks database of the bank device of FIG. 2.

DETAILED DESCRIPTION OF THE PREFERRED EMBODIMENTS

Figure 1:
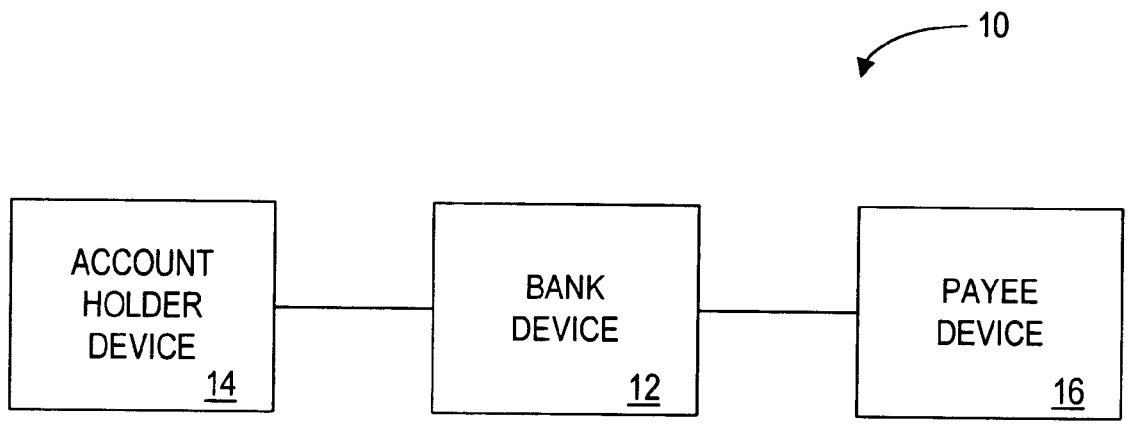
FIG. 1 is a schematic illustration of a network comprising a bank device in communication with an account holder device and a payee device.

Referring to FIG. 1, a network 10 comprises a bank device 12, which is in communication with an account holder device 14 and a payee device 16. The bank device 12 is a computer or similar device, as described further below. Each of the account holder device 14 and the payee device 16 may be a telephone, computer or other device that can transmit data to and receive data from the bank device 12. For example, the account holder device 14 and/or the payee device 16 may be a telephone that transmits dual tone multi-frequency ("DTMF") signals.

Alternatively, the account holder device 14 and/or the payee device 16 may be a computer that transmits digital signals over a network in a known manner.

The bank device 12 may be in communication with the account holder device 14 and the payee device 16 via any suitable communication medium, such as a publicly-switched telephone network or the Internet. Although one account holder device 14 and one payee device 16 are shown in FIG. 1, those skilled in the art will understand that a plurality of like devices may also be in communication with the bank device 12. Further, a plurality of other bank devices may be in communication with the account holder device 14 and one payee device 16.

Figure 2:
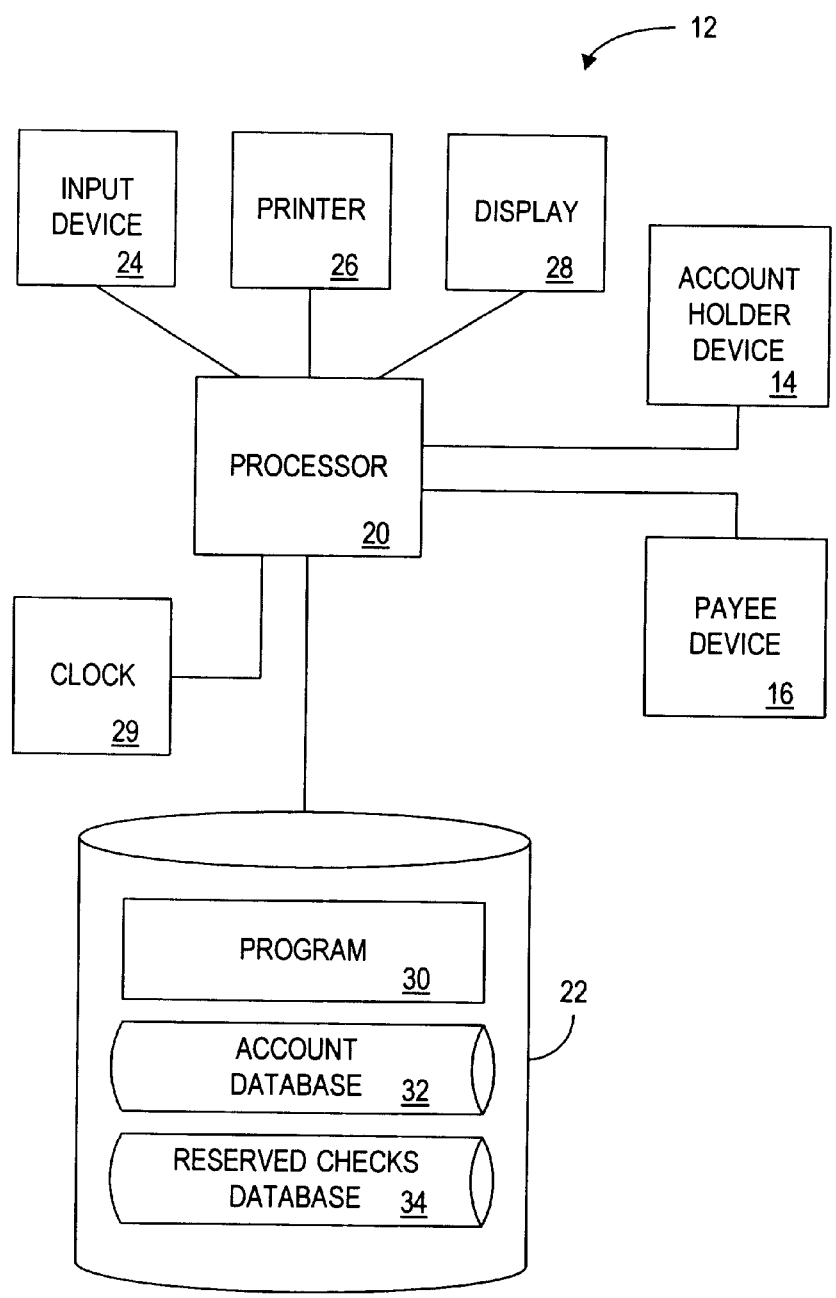
FIG. 2 is a schematic illustration of the bank device of FIG. 1.

Referring to FIG. 2, the bank device 12 of FIG. 1 is typically a computer operated by or on behalf of a bank or other entity that maintains financial accounts. The bank device 12 comprises a processor 20, such as one or more conventional microprocessors typically included in conventional computers. The processor 20 is in communication with a data storage device 22, such as an appropriate combination of magnetic, optical and/or semiconductor memory. The processor 20 and the storage device 22 may each be (i) located entirely within a single computer or other computing device; (ii) in communication with each other by a remote communication link, such as a serial port cable, telephone line or radio frequency transceiver; or (iii) a combination thereof. For example, the bank device 12 may comprise one or more computers that are in communication with a remote server computer for maintaining databases.

The processor 20 is further in communication with an input device 24, a printer 26, a display device 28 and a clock 29. The input device 24 may comprise a keypad for transmitting input signals, such as signals representative of operator commands, to the processor 20. The printer 26 is for registering indicia on paper or other material, thereby printing account statements as commanded by the processor 20. The display device 28 is a video monitor for displaying alphanumeric characters and/or images as commanded by the processor 20. The clock 29 is a device for generating signals representing the date and/or time. Many types of input devices, printers, display devices and clocks are known to those skilled in the art, and need not be described in detail herein.

The storage device 22 stores a program 30 for controlling the processor 20. The processor 20 performs instructions of the program 30, and thereby operates in accordance with the present invention, and particularly in accordance with the methods described in detail herein. The program 30 furthermore includes program elements that may be necessary, such as an operating system and "device drivers" for allowing the processor 20 to interface with computer peripheral devices. Appropriate device drivers and other necessary program elements are known to those skilled in the art, and thus need not be described in detail herein.

The storage device 22 also stores an account database 32 and a reserved checks database 34. The databases 32 and 34 are described in detail below and depicted with exemplary entries in the accompanying figures. As will be understood by those skilled in the art, the schematic illustrations of and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Figure 3:
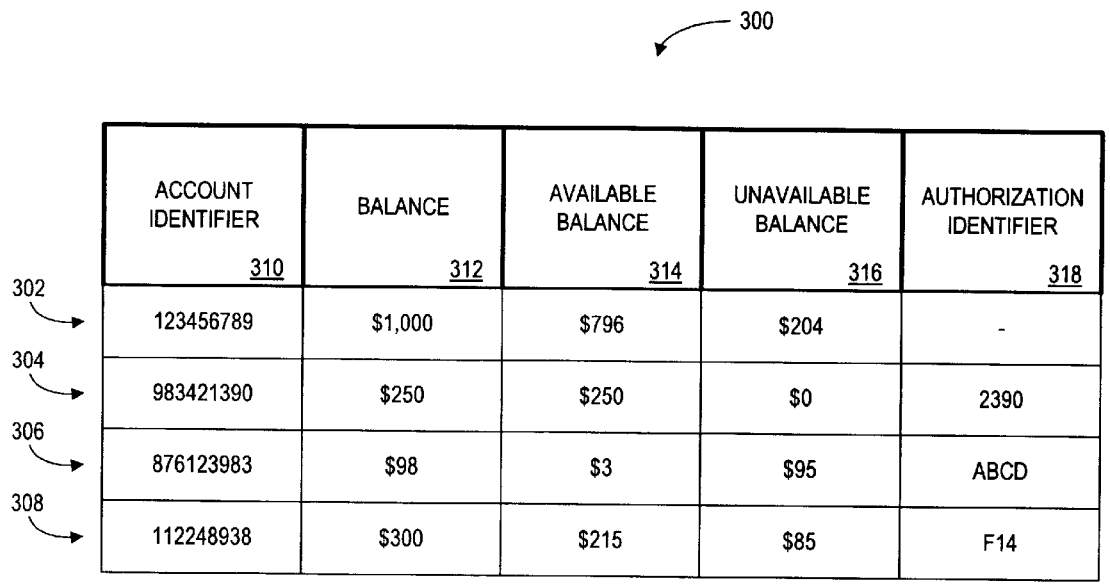
FIG. 3 is a schematic illustration an account database of the bank device of FIG. 2.

Referring to FIG. 3, a table 300 represents an embodiment of the account database 32 of FIG. 2. The table 300 includes rows 302, 304, 306 and 308, each of which represents an entry (also known as a "record") of the account database 32. Each entry defines a financial account maintained by a bank. In particular, each entry includes (i) an account identifier 310 that uniquely identifies the financial account, (ii) a balance 312 of funds in the financial account, (iii) an available balance 314 of the financial account; (iv) an unavailable balance 316 of the financial account; and (v) an authorization identifier 318 for verifying that inquiries and commands are initiated by authorized parties. The available balance defines the portion of the balance that is available for use in the financial account. Conversely, the unavailable balance defines the portion of the balance that is unavailable for use in the financial account. For example, if a check for $20 is deposited to a financial account, the balance is increased by $20, but the $20 is typically unavailable for use in the financial account until the check clears. Accordingly, the unavailable balance would likewise increase by $20, while the available balance would be unaffected by the $20 deposit. When the check clears, the unavailable balance would decrease by $20, while the available balance would increase by $20. For each financial account, the balance is the sum of the available balance and the unavailable balance.

Referring to FIG. 4, a table 400 represents an embodiment of the reserved checks database 34 of FIG. 2. The table 400 includes rows 402, 404, 406, 408 and 410, each of which represents an entry of the reserved checks database 34. Each entry defines a reserved check, which is a check that has a corresponding amount of funds that are reserved for a payee. The amount of funds is unavailable for use in the financial account on which the check is drawn. Thus, the amount of funds cannot be withdrawn or otherwise removed from the financial account except for payment with the specified check.

Each entry includes (i) a code 412, also referred to herein as a "reservation code", that uniquely identifies the entry, and thus indicates the check; (ii) an account identifier that indicates a financial account on which the check is drawn; (iii) a check identifier 416 which indicates the check, and which may be a check number or any set of alphanumeric characters; (iv) an amount of funds 418 reserved for a payee of the check; (v) an expiration date 420 after which funds reserved for the check are made available if the check has not yet been cashed; (vi) a presentment period 422 indicating a period within which the check should be presented for payment, and thus indicating a time after which check should not be accepted by a merchant unless so desired; (vii) a payee identifier 424; (viii) a time 426 the code was generated; (ix) an indication of whether and when the check was claimed 428; and (x) an indication of whether and when the check was cashed 430.

The description that follows is arranged into the following sections: Creating a Reservation Code, Verifying a Reservation Code, Check Clearing and Determining Whether Checks Have Expired.

Creating a Reservation Code

Figure 5:
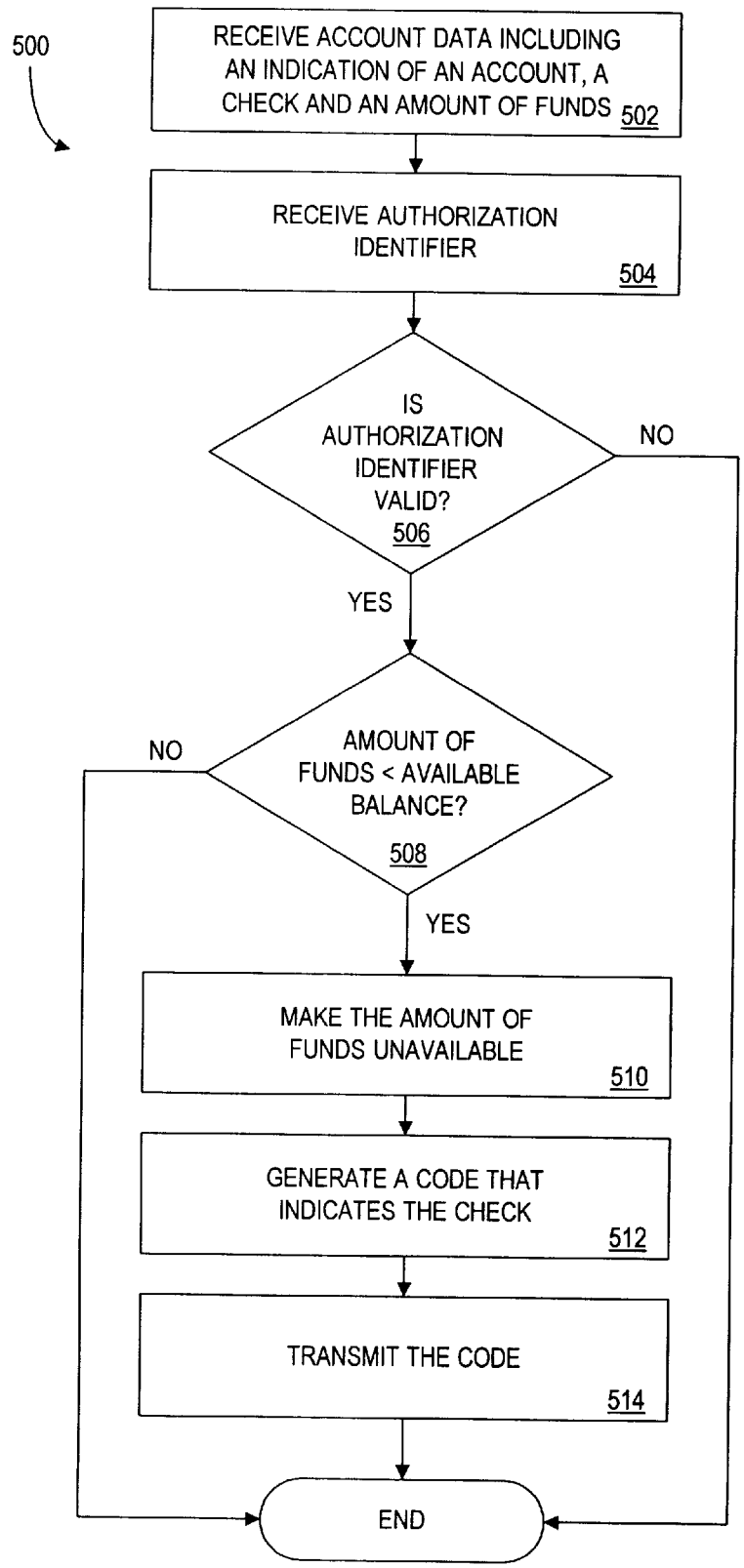
FIG. 5 is a flowchart illustrating a method for processing a request to reserve a check.

Referring to FIG. 5, a method 500 is performed by the bank device 12 (FIG. 1) when an account holder transmits from the account holder device 14 (FIG. 1) to the bank device 12 a request to reserve an amount of funds for payment with a check. For example, the account holder may call a predetermined telephone number that connects him to an automated voice-response unit ("VRU"). The account holder may then actuate buttons on the keypad of his telephone to transmit DTMF signals to the VRU. The VRU, in turn, operates in accordance with commands represented by the DTMF signals. The design of appropriate VRUs are known to those skilled in the art. Alternatively, the account holder may operate a computer to access a site on the "World Wide Web" that is associated with the bank device 12.

The bank device 12 (FIG. 1) receives check data from the account holder (step 502). The check data includes an account identifier, a check identifier, and an amount of funds. The account identifier indicates a financial account and the check identifier indicates a check drawn on the financial account. The check data may further indicate such information as an expiration date, a presentment period, a payee, and/or a bank maintaining the financial account.

In addition, the account holder may transmit commands to the bank device 12. For example, the account holder may specify that the amount of funds is made available provided that the check has not been claimed, as is described below.

The account holder may also transmit to the bank device 12 an authorization identifier (step 504) to verify that he is authorized to reserve a check. The bank device 12 then determines if the authorization identifier is valid (step 506). For example, the bank device 12 may determine whether the authorization identifier corresponds to at least one predetermined authorization identifier of the financial account, such as may be stored in the account database 32 (FIG. 2).

If the authorization identifier is valid, then it is determined whether the amount of funds is less than or equal to the available balance of the financial account (step 508). If so, then the bank device 12 makes the amount of funds unavailable for use in the financial account (step 510). A code indicating the check is generated (step 512), and the code is transmitted to the account holder device 14 of FIG. 1 (step 514).

In one embodiment, the account holder may also transmit to the bank device 12 an indication of a bank. In such an embodiment, the bank device 12 is in communication with a plurality of banks, and could process checks for account holders of those banks. The bank device 12 would determine which bank was indicated by the account holder, and perform the appropriate method steps for a financial account of that bank.

The code that indicates the check may include the account identifier and the check identifier, or portions thereof. For example, the code may be generated by concatenating the account identifier and the check identifier. In addition, one or more randomly-selected alphanumeric characters may be concatenated to the account identifier and the check identifier to generate the code.

In another embodiment, codes may be generated sequentially. Thus, a code may be generated by adding a predetermined amount to a previously generated code, such as the last-generated code.

Alternatively, the code that indicates the check can be generated such that a valid code is extremely difficult to guess, even if another code is known. For example, it may be undesirable in some embodiments to generate codes that are sequential numbers since knowledge of one code might allow another (sequential) code to be determined. Accordingly, codes may be randomly generated. If the code comprises a large number of characters, then the code is even less likely to be determined by others. For example, the bank device 12 may generate a code comprising sixteen randomly generated alphanumeric characters. In addition, the generated code must be unique, so a randomly-generated code should be compared with existing codes to assure that the code is unique. If not, additional codes may be generated until a unique code results. Those skilled in the art will understand that there are many methods for generating secure, unique, random codes.

To store the check data and other data relevant to the check, the bank device may create a record such as a record of the reserved checks database 34, described above with reference to FIG. 4. The created record may store the amount of funds, an expiration date, a presentment period within which the check should be presented for payment, a payee, a bank maintaining the financial account, and/or a time the code was generated. The record can be identified by the account identifier and the check identifier. For example, the records of the reserved checks database 34 may be sorted by account identifier and check identifier so knowledge of the account identifier and check identifier provides easy access to the record indicated thereby. Alternatively (or additionally), the record may be identified by the code, and so the code would indicate the information stored in the record.

In another embodiment, the account identifier and the check identifier can be encrypted to generate the code that indicates the check. In addition, the amount of funds and supplementary check data (e.g. an expiration date, a presentment period, a payee, a bank, and/or a time the code was generated) can be encrypted to generate the code. Such an encrypted code may be used to indicate the encrypted data. Encryption and decryption techniques are described in "Applied Cryptography: Protocols, Algorithms and Source Code in C, Second Edition", by Bruce Schneier, published 1996. Those skilled in the art will understand that the code would be generated by a cryptographic algorithm such that it would be extremely difficult for a party to generate a valid code, much less a code that indicates valid data. Encrypting the data to generate the code allows the data to be determined from the code without communication with the bank device 12 or other location where the data may be stored.

For example, data may be encrypted with the private key of a bank. Since the bank holds the private key confidential, parties without the private key would typically be unable to falsify a code. The account holder (or other party) would use the public key of the bank to decrypt the code, and determine the data therefrom.

The step 510 of making the amount of funds unavailable for use in the financial account assures a payee that the check will clear and the corresponding payment will be received. Thus, the amount of funds cannot be withdrawn, paid out using another check, or accessed by wire transfer; the amount of funds can only be used for payment with the specified check. In one embodiment, making the amount of funds unavailable comprises adjusting the unavailable balance of the financial account based on the amount of funds. Typically, the unavailable balance is increased by the amount of funds. For example, if the unavailable balance is $10, and the amount of funds is $20, the unavailable balance is increased from $10 to $30.

Alternatively, making the amount of funds unavailable can comprise transferring the amount of funds from the financial account to an inaccessible account. An inaccessible account is an account that is inaccessible to the account holder. Accordingly, the transferred amount cannot be withdrawn by the account holder or otherwise accessed. For example, the inaccessible account may be a predetermined account maintained and owned by the bank with no access by bank customers (such as account holders). Other methods of making funds unavailable will be understood by those skilled in the art.

The bank may desire to charge account holders for the privilege of using reserved checks. Accordingly, the bank may charge for each reserved check, and apply the charge to the financial account of the account holder. The bank may alternatively charge by providing a shared-revenue line, such as a "900 number", to call in order to request to reserve a check. Further methods of charging account holders will be understood by those skilled in the art.

Verifying a Reservation Code

Figure 6:
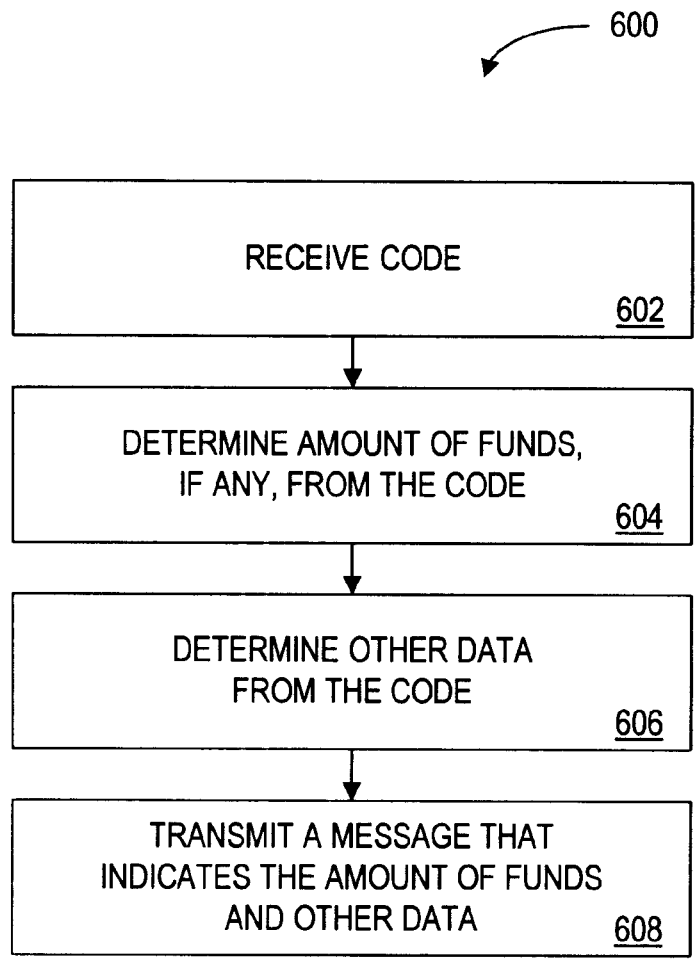
FIG. 6 is a flowchart illustrating a method for processing a request to verify a code that may indicate a reserved check.

Referring to FIG. 6, a method 600 is performed by the bank device 12 (FIG. 1) when the payee device 16 (FIG. 1) transmits a request to verify a code that may indicate a reserved check. For example, the payee may call a predetermined telephone number that connects him to an automated voice-response unit ("VRU"). The payee may then actuate buttons on the keypad of his telephone to transmit DTMF signals to the VRU. The VRU, in turn, operates in accordance with commands represented by the DTMF signals. Alternatively, the payee may operate a computer to access a site on the "World Wide Web" that is associated with the bank device 12.

The bank device 12 (FIG. 1) receives a code from the payee device 16 (step 602).

From the code, the bank device 12 determines check data, such as an amount of funds that is unavailable for use in a financial account (step 604). For example, the code may be used to identify a record of the reserved checks database 34 (FIG. 2). The record may store the amount of funds as well as other data, as described above. Accordingly, other data may be determined from the code as well (step 606).

Alternatively, the code may be encrypted with the amount of funds and other data, as described above. Thus, to determine the amount of funds and other data from the code, the code is decrypted using any of a number of techniques known to those skilled in the art. In one embodiment, decrypting a code obviates the need for the payee device 16 to communicate with a device storing data such as the amount of funds. Accordingly, such an embodiment can allow for a faster determination of the amount of funds. The decryption may be performed by a computer running decryption software, and such a computer may be operated directly by the payee or may be a computer remotely accessible through a network such as the Internet. For example, a payee may ascertain the public key of a bank (e.g. the public key may be published or provided with the check). The public key enables the data to be determined from the code using a decryption algorithm.

Once the amount of funds (and any other desired data) is determined, the bank device 12 transmits a message to the payee device 16 (step 608). The message indicates the amount of funds, and any other data determined from the code. The message may explicitly specify the amount of funds. Such a message may be a pre-recorded or synthesized audio message, such as "Twenty-five dollars has been reserved for check number 193 on account number 7346528735". Alternatively, a message may indicate whether the amount of funds is sufficient to cover a requested amount specified by the payee. For example, the payee device 16 may transmit a requested amount (e.g. "$20") to the bank device 12, and the bank device responds by transmitting a message indicating whether the requested amount is less than (or greater than) the amount of funds (e.g. "sufficient" or "yes"). Of course, if the code does not correspond to a reserved check, or if insufficient funds are available, then an appropriate message is transmitted.

The message may also indicate the presentment period, which is a period within which the check should be presented for payment. Such a presentment period is typically specified by the account holder, and is useful in communicating to the merchant when the check is intended to be presented. For example, a merchant may specify that it will accept checks only if a presentment period is indicated by a code and the check is presented during the presentment period. This would reduce the ability of an account holder to present copies of the same check to more than one merchant.

Referring again to FIGS. 4 and 6, the process 600 (FIG. 6) is described with reference to exemplary data depicted in the table 400 (FIG. 4). The bank device 12 receives a code "12346128982001" from the payee device 16. From the code, the bank device 12 identifies the record 410 (FIG. 4) which stores the amount of funds "$19" as well as other data, such as a check identifer "121" and an expiration date "9/3/99". The bank device 12 then transmits to the payee device 16 a message "$19 has been reserved for check number 121 of account 123456789".

Figure 7:
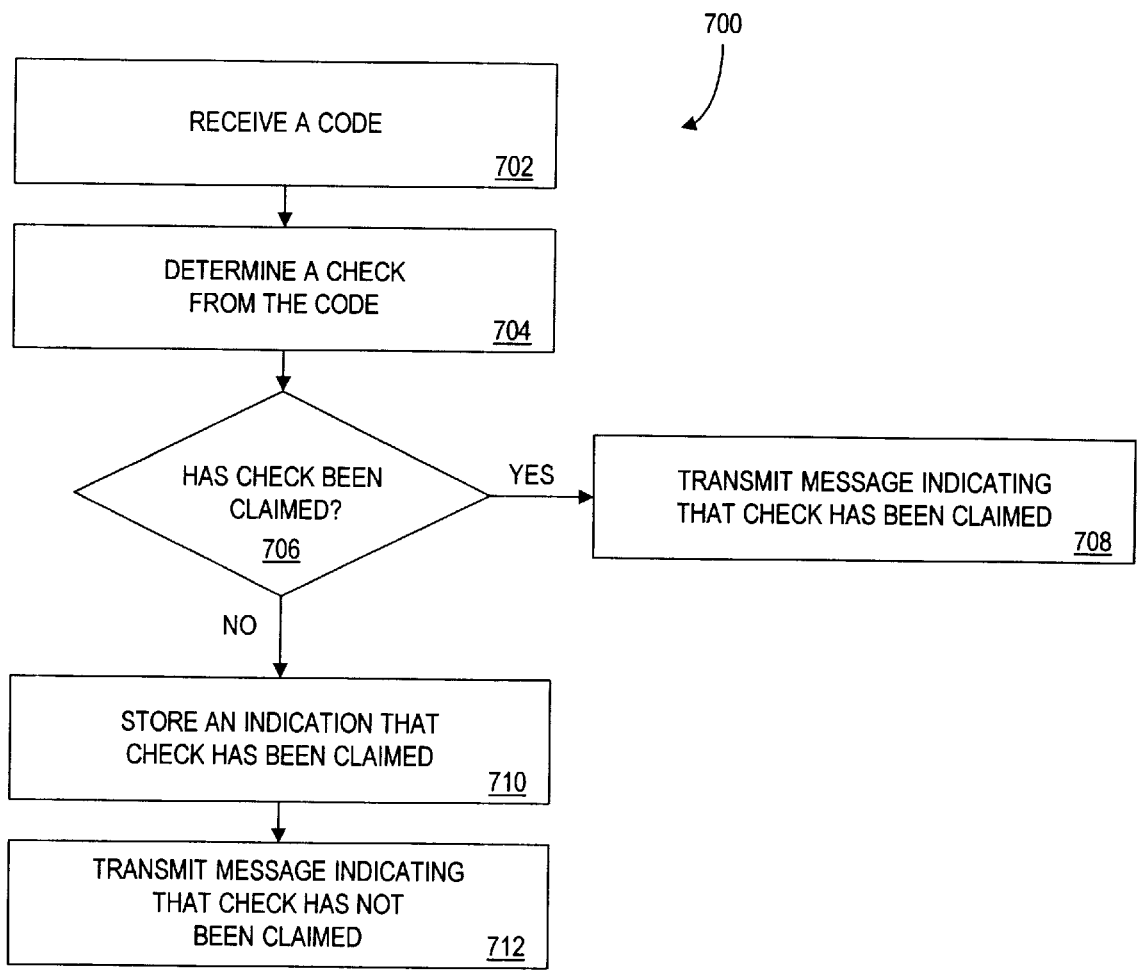
FIG. 7 is a flowchart illustrating a method for processing a request to claim a check that is associated with a code.

Referring to FIG. 7, a method 700 is performed by the bank device 12 (FIG. 1) when the payee device 16 (FIG. 1) transmits a request to "claim" a check that is associated with a code. Claiming a check includes identifying the check as having been presented as payment. Thus, a payee would claim a check to indicate to others (especially other payees) that they should not accept the same check (e.g. a photocopy or other duplicate of the check, which would have the same check number and account number). Claiming a check may also be considered an indication of a payee's intent to cash the check. The method 700 may be performed in conjunction with or separately from the method 600 (FIG. 6). For example, the bank device may include a VRU that allows the caller to select from several options. Accordingly, the VRU may transmit a message, such as "Press 1 to verify an amount of reserved funds, press 2 to claim a check", and process received DTMF signals to select an appropriate option.

The bank device 12 (FIG. 1) receives a code from the payee device 16 (step 702). From the code, the bank device 12 determines a check corresponding to the code (step 704). It is then determined whether the check has been claimed (step 706). For example, the code may be used to identify a record of the reserved checks database 34 (FIG. 2). The record may store an indication of whether and when the check was claimed and/or cashed, as described above. Other data may be determined from the code as well.

If the check has been claimed, the bank device 12 transmits an appropriate message indicating that the check has been claimed (step 708). If not, then the bank device 12 stores an indication that the check was claimed (step 710), typically in the corresponding record of the reserved checks database 34. The bank device 12 further transmits an appropriate message indicating that the check had not yet been claimed (step 712), but has now been claimed pursuant to this transaction.

Referring again to FIGS. 4 and 7, the process 700 (FIG. 7) is described with reference to exemplary data depicted in the table 400 (FIG. 4). The bank device 12 receives a code "111345870426703" from the payee device 16. From the code, the bank device 12 determines a check corresponding to the code, as represented by the entry 406. It is then determined from the entry 406 that the check has not been claimed. The bank device 12 stores in the entry 406 an indication that the check was claimed, and transmits a message "Check number 120 of account number 123456789 for $85 was not yet claimed. You have now claimed it." Optionally, the bank device may offer the payee the option of claiming the check before storing an indication that the check was claimed.

Figure 8:
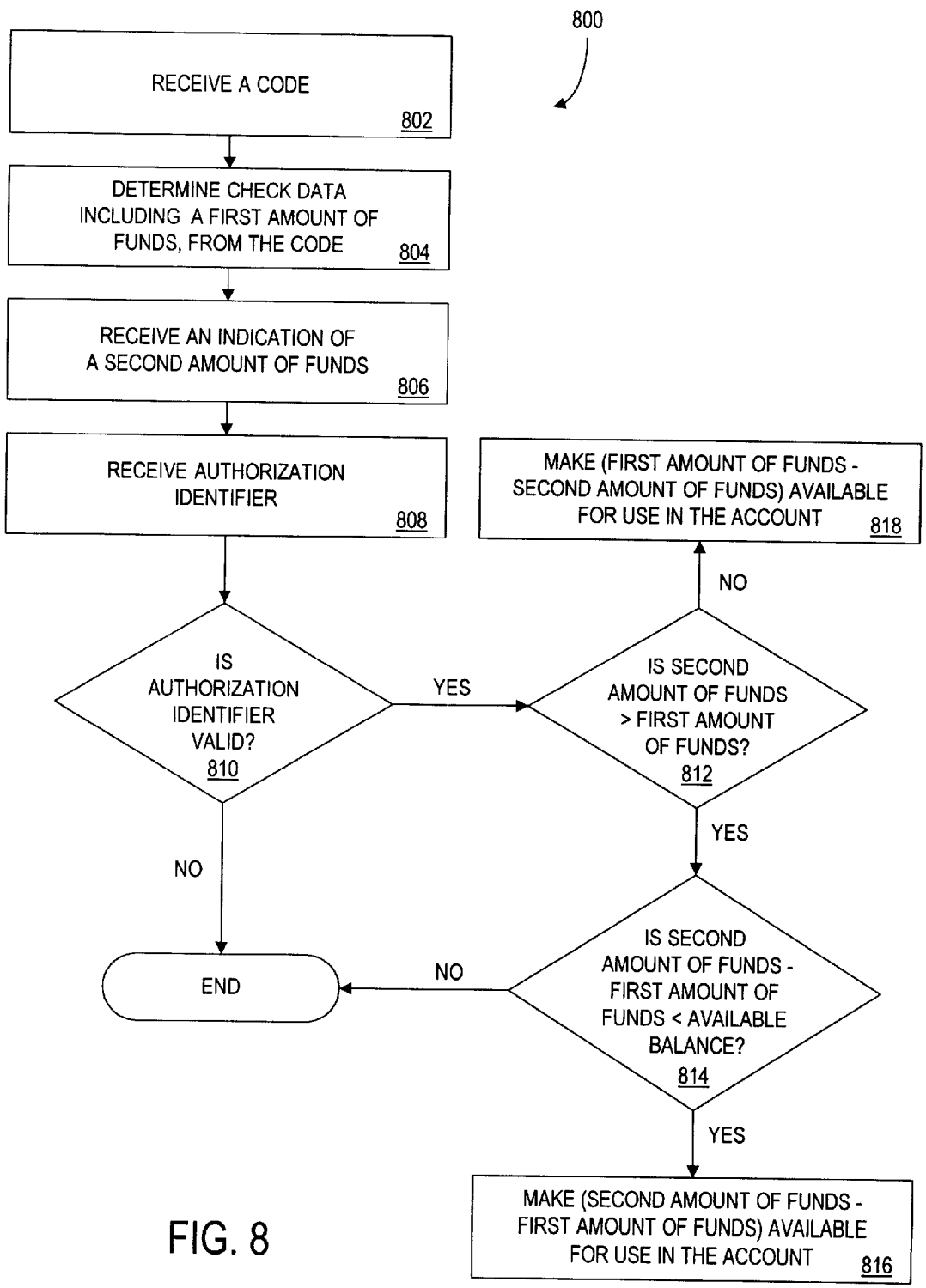
FIG. 8 is a flowchart illustrating a method for processing a request to change an amount of funds reserved for a payee of a check.

Referring to FIG. 8, a method 800 is performed by the bank device 12 (FIG. 1) when the account holder device 14 (FIG. 1) transmits a request to change the amount of funds reserved for a payee of a check. In particular, the account holder desires to change the amount reserved from a first amount to a second amount. Such a method is advantageous when the account holder has designated an amount of funds that is greater than or less than what he desired. For example, an account holder may have designated a check as having $20 reserved, in anticipation of a purchase of desired goods. Subsequently, the account holder may discover that the price of the desired goods are in fact $30. He may then transmit a request to change the amount of funds reserved from $20 to $30.

The bank device 12 (FIG. 1) receives a code from the account holder device 14 (step 802). From the code, the bank device 12 determines a first amount of funds (step 804), which is the amount reserved for a payee of a certain check. For example, the code may be used to identify a record of the reserved checks database 34 (FIG. 2). The record may store an indication of the first amount of funds, as described above. Other data may be determined from the code as well.

The bank device 12 also receives from the account holder device 14 an indication of a second amount of funds (step 806) and an authorization identifier (step 808). If it is determined that the authorization identifier is valid (step 810), then the banking device 12 determines whether the second amount of funds is greater than the first amount of funds (step 812). If so, then the account holder desires to increase the amount of funds reserved. Accordingly, if the amount of the increase (i.e. the difference between the second amount of funds and the first amount of funds) is less than or equal to the available balance of the corresponding financial account (step 814), then the amount of the increase is made unavailable for use in the financial account (step 816). Otherwise, there are not enough available funds, so the request to increase the amount of funds reserved is denied.

If the second amount of funds is not greater than the first amount of funds, then the account holder desires to decrease the amount of funds reserved. Accordingly, the difference between the first amount of funds and the second amount of funds is made available for use in the financial account (step 818). The ability of an account holder to decrease the amount of funds reserved may be subject to limitations. For example, the amount of funds reserved may be decreased provided that the check has not been claimed. Alternatively, the amount of funds reserved may be decreased only after a predetermined time, such as after the expiration date, one month after the code is generated, or one week after the presentment period.

If the second amount of funds is zero, then the first amount of funds is made available for use in the financial account. In such a situation, the account holder has requested to make the first amount of funds (the reserved amount) available for use in the financial account. Alternatively, instead of specifying a second amount of funds, the account holder device 14 may transmit to the bank device 12 a signal representing a request to make the amount of funds of a reserved check available for use in the financial account. The bank device would then make the amount of funds of the reserved check available for use in the financial account, subject to limitations as described above.

In one embodiment, making the amount of funds available comprises adjusting the unavailable balance of the financial account based on the amount of funds to make available. Typically, the unavailable balance is decreased by the amount of funds. For example, if the unavailable balance is $40, and the amount of funds is $25, then the unavailable balance is decreased from $40 to $15 and the available balance is increased by $25. Alternatively, making the amount of funds available can comprise transferring the amount of funds from an inaccessible account to the financial account. Other methods of making funds available will be understood by those skilled in the art.

Referring again to FIGS. 3, 4 and 8, the process 800 (FIG. 8) is described with reference to exemplary data depicted in the table 300 (FIG. 3) and the table 400 (FIG. 4). The bank device 12 receives a code "1386511042792" from the account holder device 14. From the code, the bank device 12 identifies the record 404 of the reserved checks database 34. The record stores an indication of the first amount of funds, "$95", and an account identifier "876123983". The bank device 12 also receives from the account holder device 14 an indication of a second amount of funds "$110" and an authorization identifier "ABCD". The banking device 12 also determines from the entry 306 (FIG. 3) that the valid authorization identifier for account identifier "876123983" is "ABCD", so it is thus determined that the authorization identifier is valid.

The banking device 12 then determines that the second amount of funds "$110" is greater than the first amount of funds "$95", so the amount of the increase is "$15" (15= 110−95). The banking device 12 also determines from the entry 306 (FIG. 3) that the available balance for account identifier "876123983" is "$3". Since the amount of the increase "$15" is greater than the available balance "$3", the amount of the increase cannot be made unavailable for use in the financial account, and the request to change the amount of funds reserved is denied.

The bank may desire to charge payees and/or account holders for the information provided. Accordingly, the bank may charge for verifying a code, and require a credit card number to be entered as payment. The bank may alternatively charge by providing a shared-revenue line, such as a "900 number", to call. Further methods of charging payees will be understood by those skilled in the art.

Check Clearing

Figure 9:
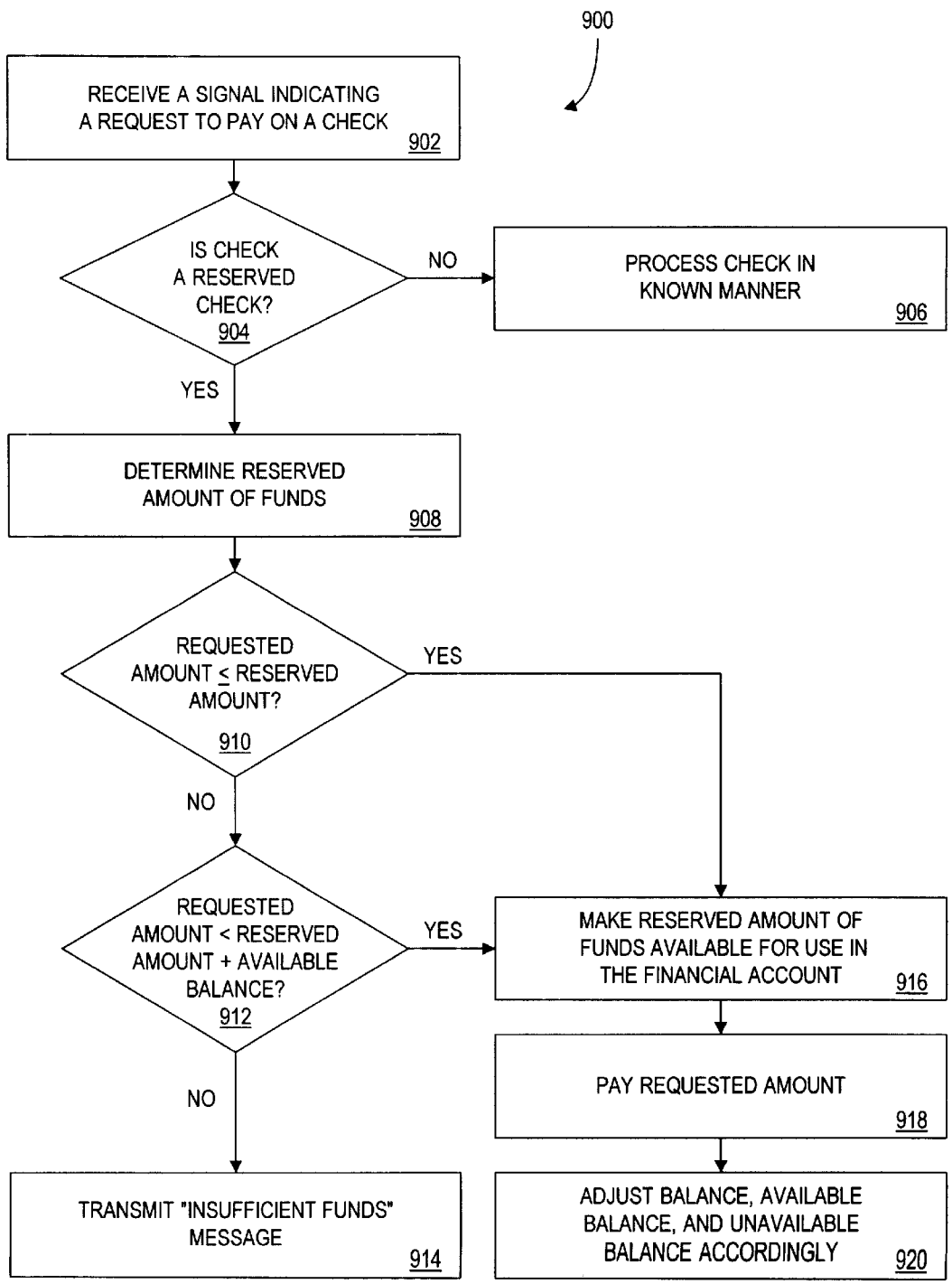
FIG. 9 is a flowchart illustrating a method for processing a request to pay on a check.

Referring to FIG. 9, a method 900 is performed by the bank device 12 (FIG. 1) when receiving a request to pay on a check. The bank device typically receives such a request after the check has been deposited by a payee at a payee bank.

The bank device 12 (FIG. 1) receives a signal that indicates a request to pay on a check (step 902). The signal further represents a check identifier, an account identifier and a requested amount of funds. As described above, the account identifier indicates a financial account and the check identifier indicates the check, which is drawn on the financial account. The requested amount of funds indicates the amount for which the check is written, and is thus the amount that the payee expects to receive by depositing the check.

From the account identifier and the check identifier, the bank device 12 determines whether the check is a reserved check (step 904). For example, the bank device may search the reserved checks database 34 (FIG. 2) for entries corresponding to the account identifier and the check identifier. If the check is not a reserved check, then the check is processed in a known manner (step 906). Otherwise, the amount of funds reserved for a payee of the check is determined (step 908).

If the requested amount is greater than the reserved amount (step 910), then there may not be enough funds in the financial account to pay the requested amount. For example, the account holder may have indicated that $20 be reserved for a particular check, yet he may have also written the amount of the check to be $30. In such a situation, the payee may not have verified a code indicating the check, or may have accepted the check regardless of the insufficient reserved amount. Accordingly, it may be possible to pay the requested amount with additional funds beyond those funds reserved for the check. It is determined whether the requested amount of funds is less than or equal to the sum of the reserved amount of funds and the available balance of the financial account (step 912). If not, the bank device 12 transmits an "insufficient funds" message (step 914) or similar appropriate transmission to indicate that there are insufficient funds to pay the requested amount.

If there are enough funds in the financial account to pay the requested amount, the reserved amount of funds is made available for use in the financial account (step 916), and the requested amount is paid (step 918). The balance, available balance and unavailable balance of the financial account are adjusted accordingly (step 920) to reflect the paid amount and the amount made available.

Referring again to FIGS. 3, 4 and 9, the process 900 (FIG. 9) is described with reference to exemplary data depicted in the table 300 (FIG. 3) and the table 400 (FIG. 4). The bank device 12 receives a signal that indicates a request to pay $90 on a check "120" of a financial account "123456789". From the account identifier "123456789" and the check identifier "120", the bank device 12 determines that the check is a reserved check by searching the reserved checks database 34 (FIG. 2) for entries corresponding to the account identifier "123456789" and the check identifier "120". In particular, the entry 406 corresponds to the account identifier "123456789" and the check identifier "120". The amount of funds reserved for a payee of the check is determined to be $85.

Since the requested amount $90 is greater than the reserved amount $85, there may not be enough funds in the financial account to pay the requested amount. Referring to the entry 302, the available balance of the financial account "123456789" is determined to be $796. It is then determined that the requested amount $90 is less than $881 (the sum of the reserved amount $85 and the available balance $796). The reserved amount $85 is made available for use in the financial account, and the requested amount $90 is paid. The balance is reduced by $90, the available balance is reduced by $5 ($90−$85), and the unavailable balance is reduced by $85.

Determining Whether Checks Have Expired

It is possible that a reserved check will never be deposited by a payee. For example, the reserved check may be lost or stolen, or the account holder may have changed his mind and never provided the reserved check to the payee. Accordingly, it is advantageous to determine whether any reserved checks have "expired" without being cashed so the reserved funds may be made available for use in the financial account.

Figure 10:
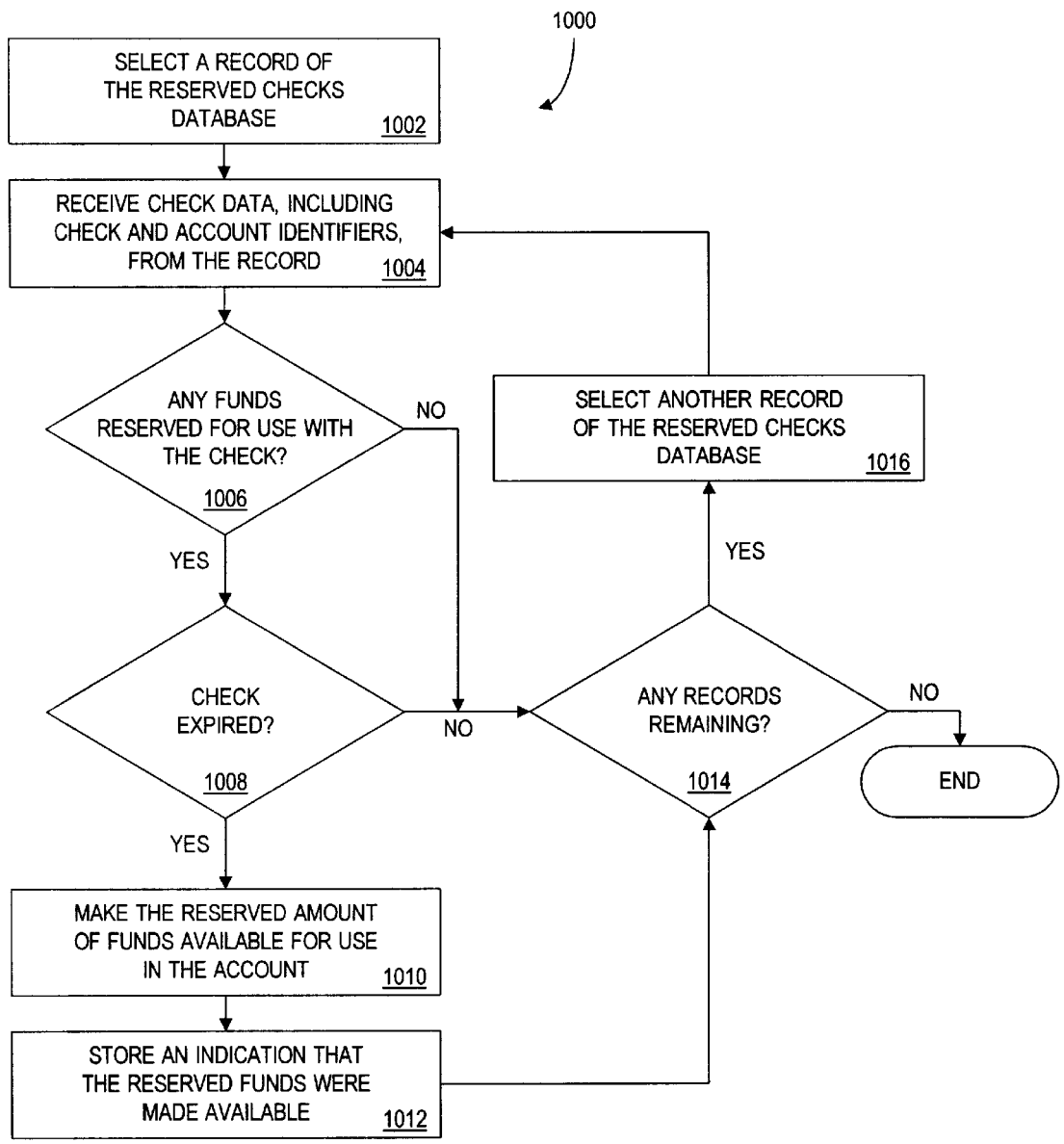
FIG. 10 is a flowchart illustrating a method for determining whether any reserved checks have expired without being cashed.

Referring to FIG. 10, a method 1000 is performed by the bank device 12 (FIG. 1) periodically in order to determine whether any reserved checks have "expired" without being cashed. If so, the funds reserved for the checks are made available for use in the corresponding financial accounts. At step 1002, a record of the reserved checks database 34 (FIG. 2) is selected. For example, the first record may be selected. Alternatively, the records may be sorted by expiration date and a record including an expiration date within a predetermined range of expiration dates is selected. The bank device 12 then receives a check identifier and an account identifier from the record (step 1004). If there are funds reserved for use with the indicated check (step 1006), and the check has expired (step 1008), then the reserved amount of funds is made available for use in the financial account (step 1010). Determining whether the check has expired typically includes determining the expiration date of the record, determining the current date (e.g. from the clock 29), and then determining whether the current date is after the expiration date. The bank device may also store an indication that the reserved funds were made available (step 1012). Such an indication may be used in printing statements alerting the account holder that the reserved check has expired.

If there aren't funds reserved for use with the indicated check, or if the check has not expired, then it is determined whether there are any records remaining to be examined as described above (step 1014). If so, another record is selected (step 1016) and the check identifier and the account identifier are received from the record (step 1004) and processed, as described above.

Figure 11A:
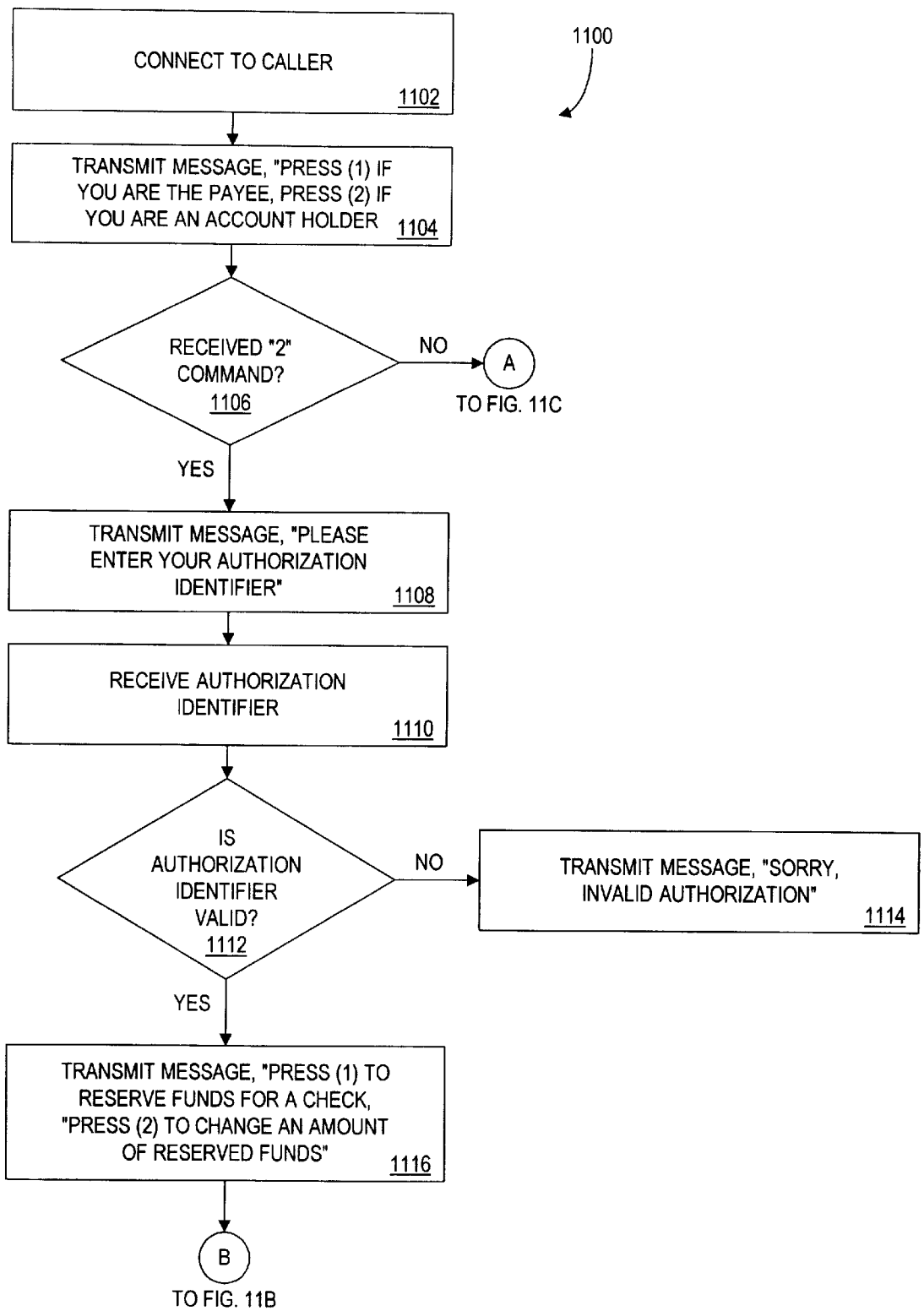
FIGS. 11A, 11B and 11C illustrate a flowchart illustrating an exemplary method for processing commands received from the account holder device and the payee device.
Figure 11B:
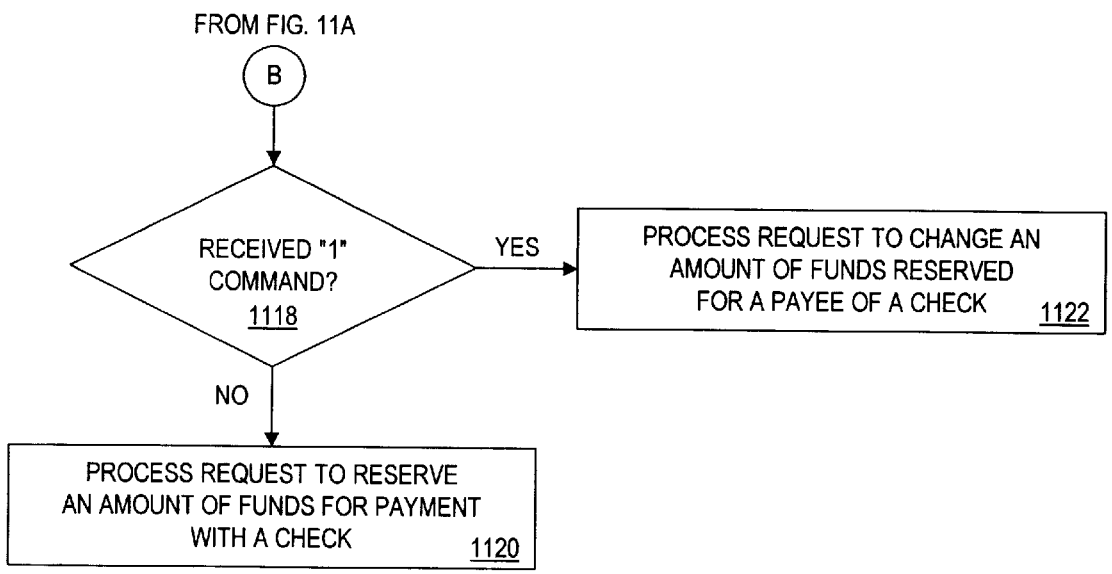
Figure 11C:
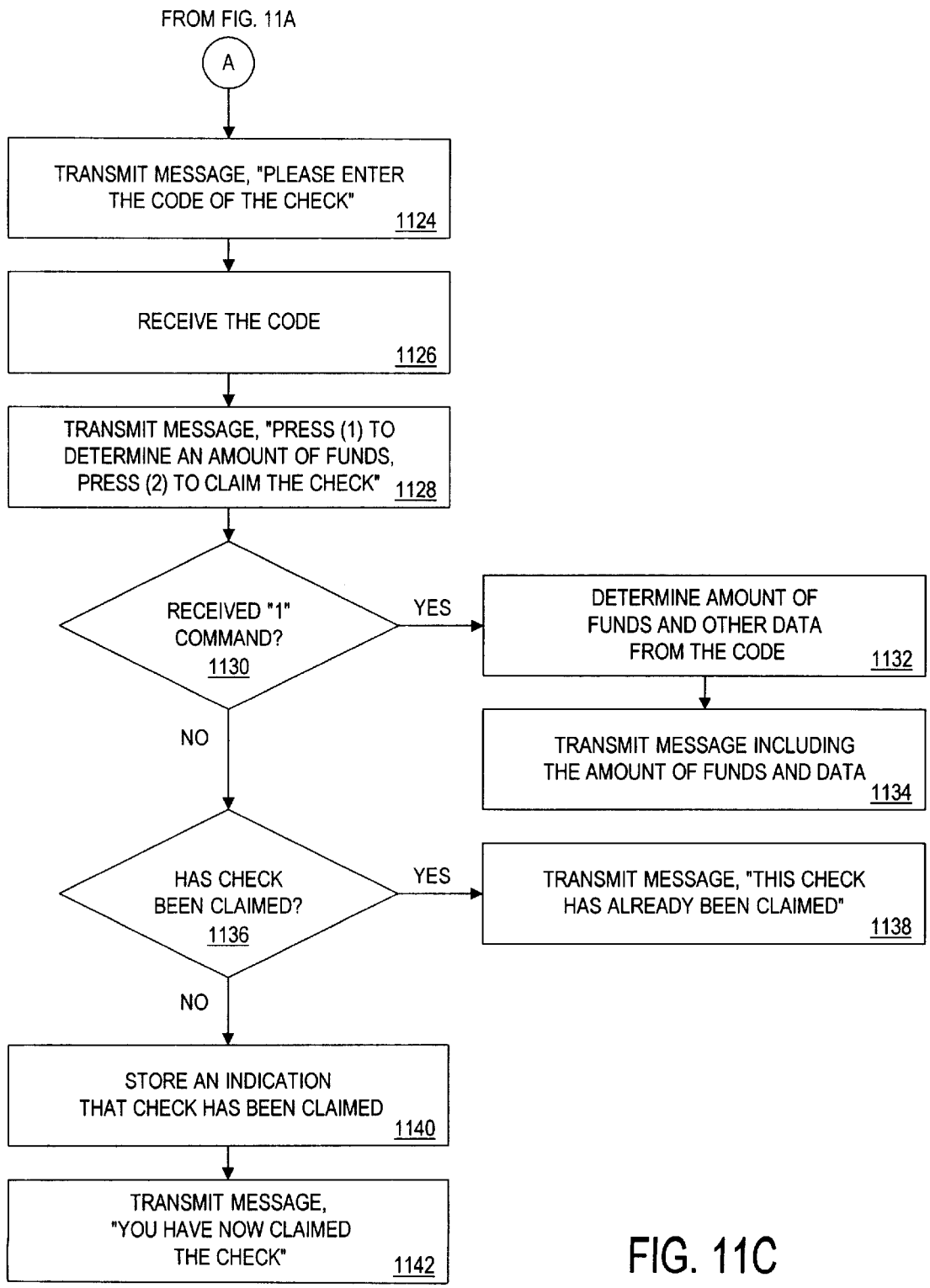

Referring to FIGS. 11A, 11B and 11C, an exemplary method 1100 is performed by the bank device 12 (FIG. 1) for processing commands that are received from the account holder device and/or the payee device. In one embodiment described with reference to FIGS. 11A, 11B and 11C, the commands are DTMF signals received from a telephone and processed by a VRU of the bank device 12. In another embodiment, the commands may be signals received from a computer via a network connection.

The VRU receives a signal indicating a caller has connected (step 1102). In response, the VRU transmits a message, such as "press 1 if you are a payee of a check, press 2 if you are an account holder" (step 1104). If the latter command is entered (step 1106), then the VRU transmits a message requesting that the account holder enter his authorization identifier (step 1108). The VRU then receives DTMF signals representing an entered authorization identifier (step 1110). If the entered authorization identifier is not valid (step 1112), then the VRU transmits an appropriate message to the caller (step 1114) that informs him of the invalid authorization identifier.

Otherwise, the VRU transmits a message, such as "press 1 to reserve funds for a check, press 2 to change an amount of reserved funds" (step 1116). If the former command is entered (step 1118), then the bank device 12 processes the request to reserve an amount of funds for payment with a check (step 11120), as described above with reference to FIG. 5. If the latter command is entered, then the bank device 12 processes the request to change the amount of funds reserved for a payee of a check (step 1122), as described above with reference to FIG. 8.

If at step 1106 the former command is entered, then the VRU transmits a message requesting that the payee enter the code (step 1124). The VRU then receives DTMF signals representing an entered code (step 1126). The VRU transmits a message, such as "press 1 to determine an amount of funds reserved for a check, press 2 to claim a check" (step 1128). If the former command is entered (step 1130), then the bank device 12 determines the amount of funds and other data from the code (step 1132) as described above. The VRU then transmits a message to the caller informing him of the amount of funds and the other data (step 1134).

If at step 1130 the latter command is entered, then the bank device 12 determines whether the check indicated by the code has been claimed (step 1136). If so, then the VRU transmits a message to the caller informing him that the check has already been claimed (step 1138). If the check has not been claimed, then the bank device 12 stores an indication that the check has been claimed (step 1140) pursuant to this caller's command, and the VRU transmits an appropriate message so indicating (step 1142).

In summary, the present invention offers many advantages. An account holder can reserve an amount of funds for payment with a particular check a significant amount of time before a transaction. Thus, well before the transaction the account holder can assure that sufficient funds will be available for payment with the check. In addition, the payee is likewise able to verify that the check will clear and that he will thus receive payment.

Further, in one embodiment of the present invention, account holders and payees may use conventional telephones, including car telephones and mobile (hand-held) telephones, to communicate with the bank device. Accordingly, a large number of parties may take advantage of the present invention, and may do so from a variety of locations or even while in transit. For example, two parties on a train in motion could perform the above-described methods of the present invention.

In the present invention, the account holder, not the payee, specifies the amount of funds to reserve for payment with a particular check. The account holder may transmit the reservation code to an unknown party, such as someone selling on the Internet. The reservation code could then be verified by the party, well before the corresponding check could be delivered to the party.

Although the present invention has been described with respect to a preferred embodiment thereof, those skilled in the art will note that various substitutions may be made to those embodiments described herein without departing from the spirit and scope of the present invention.

What is claimed is:

1. A method for processing checks, comprising:
   receiving check data that includes an account identifier, a check identifier, and an amount of funds, the account identifier indicating a financial account and the check identifier indicating a check drawn on the financial account;
   making the amount of funds unavailable for use in the financial account by transferring the amount of funds from the financial account;
   generating a code that indicates the check, wherein the code is generated by encrypting at least one of the account identifier, the check identifier, and the amount of funds; and
   transmitting the code.

2. The method of claim 1, in which transferring the amount of funds from the financial account comprises:

transferring the amount of funds from the financial account to an inaccessible account.

3. A method for processing checks, comprising:

receiving a code;

determining check data based on the code, the check data including
   an amount of funds that is unavailable for use in a financial account, the amount of funds reserved for payment with a check; and transmitting a message that indicates the amount of funds.

4. The method of claim 3, further comprising:

receiving a signal representing a request to ascertain whether the check has been claimed;

determining whether the check has been claimed; and transmitting a message indicating whether the check has been claimed.

5. The method of claim 4, further comprising:

if the check has not been claimed, storing an indication that the check has been claimed.

6. The method of claim 3, in which the check data further includes:

an account identifier that indicates the financial account, and a check identifier that indicates the check, the check being drawn on the financial account.

7. The method of claim 3, in which the message further indicates at least one of the financial account and the check.

8. The method of claim 3, further comprising:

determining supplementary check data based on the code, the supplementary check data including an indication of at least one of
   an expiration date,
   a presentment period within which the check should be presented for payment,
   a payee,
   a bank maintaining the financial account,
   a time the code was generated, and
   whether the check was cashed.

9. The method of claim 8, in which the message further indicates the supplementary check data.

10. The method of claim 3, further comprising:

receiving a request indicating a requested amount; and in which transmitting a message comprises:

transmitting a message indicating whether the requested amount is greater than the amount of funds.

11. A method for processing checks, comprising:

receiving a signal indicating a request to pay on a check, the signal further representing a check identifier, an account identifier and a first amount of funds, the account identifier indicating a financial account and the check identifier indicating a check drawn on the financial account; and making the first amount of funds available for use in the financial account.

12. A method for processing checks, comprising:

receiving a code that is encrypted with an amount of funds, the amount of funds reserved for payment with a predetermined check;

decrypting the code to determine the amount of funds;

receiving a request indicating a requested amount and transmitting a message indicating whether the requested amount is greater than the amount of funds.

13. The method of claim 12, in which the code is further encrypted with an account identifier indicating a financial account and a check identifier indicating the predetermined check which is drawn on the financial account; and in which decrypting comprises:

decrypting the code to determine the financial account and the check identifier.

14. The method of claim 12, in which the code is further encrypted with an indication of at least one of:
   an expiration date,
   a presentment period within which a check should be presented for payment,
   a payee,
   a bank, and
   a time the code was generated.

15. The method of claim 12, in which decrypting comprises:

decrypting the code to determine at least one of:
   the expiration date,
   the presentment period within which the check should be presented for payment,
   the payee,
   the bank, and
   the time the code was generated.

16. A method for processing checks, comprising:

receiving check data that include an account identifier indicating a financial account and a check identifier indicating a check drawn on the financial account;

determining whether the check data indicate an amount of funds unavailable for use in the financial account;

determining whether the check has expired; and making the amount of funds available for use in the financial account if the check has expired.

17. The method of claim 16, in which determining whether the check has expired comprises:

determining an expiration date based on the check data;

determining a current date; and determining whether the current date is after the expiration date.

18. A method for processing checks, comprising:

receiving a code;

determining check data based on the code, the check data including
   a check identifier that indicates a check drawn on a financial account, and
   an indication of a first amount of funds that is unavailable for use in the financial account, the first amount of funds reserved for payment with the check; and receiving an indication of a second amount of funds;

receiving an authorization identifier;

determining whether the authorization identifier is valid;

if the authorization identifier is valid,
   making unavailable for use in the financial account an amount of funds that is based on the first amount of funds and the second amount of funds.

19. A method for processing checks, comprising:

receiving a code;

determining check data based on the code, the check data including
   a check identifier that indicates a check drawn on a financial account, and
   an indication of an amount of funds that is unavailable for use in the financial account, the amount of funds reserved for payment with the check; and receiving a signal representing a request to make the amount of funds available for use in the financial account;

receiving an authorization identifier;

determining whether the authorization identifier is valid;

if the authorization identifier is valid, making the amount of funds available for use in the financial account.

20. The method of claim 19, in which making the amount of funds available comprises:

determining a current date;

determining an authorization date based on the code;

determining whether the current date is after the authorization date; and making the amount of funds available for use in the financial account if the current date is after the authorization date.

21. A method for processing checks, comprising:

receiving check data that include an account identifier, a check identifier, and an amount of funds, the account identifier indicating a financial account and the check identifier indicating a check drawn on the financial account;

making the amount of funds unavailable for use in the financial account;

generating a code that indicates the check;

transmitting the code;

receiving a signal indicating clearance of a check, the signal further representing the check identifier, the account identifier and a first amount of funds;

determining, based on the account identifier and the check identifier, a second amount of funds that is unavailable for use in the financial account;

determining whether the first amount of funds is not greater than the second amount of funds; and making the second amount of funds available for use in the financial account if the first amount of funds is not greater than the second amount of funds.

22. A method for processing checks, comprising:

receiving a code;

determining check data based on the code, the check data including a check identifier that indicates a check drawn on a financial account;

determining whether the check has been claimed; and transmitting a message indicating whether the check has been claimed.

23. The method of claim 22, further comprising:

if the check has not been claimed, storing an indication that the check has been claimed.

24. An apparatus for processing checks, comprising:

a storage device; and a processor connected to the storage device, the storage device storing a program for controlling the processor; and the processor operative with the program to:

receive a signal indicating a request to pay on a check, the signal further representing a check identifier, an account identifier and a first amount of funds, the account identifier indicating a financial account and the check identifier indicating a check drawn on the financial account; and make the first amount of funds available for use in the financial account.

25. A computer readable medium encoded with processing instructions for implementing a method for processing checks, the method comprising:

receiving a signal indicating a request to pay on a check, the signal further representing a check identifier, an account identifier and a first amount of funds, the account identifier indicating a financial account and the check identifier indicating a check drawn on the financial account; and making the first amount of funds available for use in the financial account.

26. An apparatus for processing checks, comprising:

a storage device; and a processor connected to the storage device, the storage device storing a program for controlling the processor; and the processor operative with the program to:

receive check data that include an account identifier indicating a financial account and a check identifier indicating a check drawn on the financial account;

determine whether the check data indicate an amount of funds unavailable for use in the financial account;

determine whether the check has expired; and make the amount of funds available for use in the financial account if the check has expired.

27. A computer readable medium encoded with processing instructions for implementing a method for processing checks, the method comprising:

receiving check data that include an account identifier indicating a financial account and a check identifier indicating a check drawn on the financial account;

determining whether the check data indicate an amount of funds unavailable for use in the financial account;

determining whether the check has expired; and making the amount of funds available for use in the financial account if the check has expired.

28. An apparatus for processing checks, comprising:

a storage device; and a processor connected to the storage device, the storage device storing a program for controlling the processor; and the processor operative with the program to:

receive a code;

determine check data based on the code, the check data including a check identifier that indicates a check drawn on a financial account, and an indication of a first amount of funds that is unavailable for use in the financial account, the first amount of funds reserved for payment with the check;

receive an indication of a second amount of funds;

receive an authorization identifier;

determine whether the authorization identifier is valid; and if the authorization identifier is valid, make unavailable for use in the financial account an amount of funds that is based on the first amount of funds and the second amount of funds.

29. A computer readable medium encoded with processing instructions for implementing a method for processing checks, the method comprising:

receiving a code;

determining check data based on the code, the check data including a check identifier that indicates a check drawn on a financial account, and an indication of a first amount of funds that is unavailable for use in the financial account, the first amount of funds reserved for payment with the check; and receiving an indication of a second amount of funds;
receiving an authorization identifier;
determining whether the authorization identifier is valid;
if the authorization identifier is valid,
    making unavailable for use in the financial account an amount of funds that is based on the first amount of funds and the second amount of funds.

30. An apparatus for processing checks, comprising:

a storage device; and a processor connected to the storage device, the storage device storing a program for controlling the processor; and the processor operative with the program to:
    receive a code;
    determine check data based on the code, the check data including
        a check identifier that indicates a check drawn on a financial account, and
        an indication of an amount of funds that is unavailable for use in the financial account, the amount of funds reserved for payment with the check; and
    receive a signal representing a request to make the amount of funds available for use in the financial account;
    receive an authorization identifier;
    determine whether the authorization identifier is valid;
    if the authorization identifier is valid,
        make the amount of funds available for use in the financial account.

31. A computer readable medium encoded with processing instructions for implementing a method for processing checks, the method comprising:

receiving a code;

determining check data based on the code, the check data including
    a check identifier that indicates a check drawn on a financial account, and
    an indication of an amount of funds that is unavailable for use in the financial account, the amount of funds reserved for payment with the check; and receiving a signal representing a request to make the amount of funds available for use in the financial account;

receiving an authorization identifier;

determining whether the authorization identifier is valid;

if the authorization identifier is valid,
    making the amount of funds available for use in the financial account.

32. An apparatus for processing checks, comprising:

a storage device; and a processor connected to the storage device, the storage device storing a program for controlling the processor; and the processor operative with the program to:
    receive check data that include an account identifier, a check identifier, and an amount of funds, the account identifier indicating a financial account and the check identifier indicating a check drawn on the financial account;
    make the amount of funds unavailable for use in the financial account;
    generate a code that indicates the check;
    transmit the code;
    receive a signal indicating clearance of a check, the signal further representing the check identifier, the account identifier and a first amount of funds;
    determine, based on the account identifier and the check identifier, a second amount of funds that is unavailable for use in the financial account;
    determine whether the first amount of funds is not greater than the second amount of funds; and
    make the second amount of funds available for use in the financial account if the first amount of funds is not greater than the second amount of funds.

33. A computer readable medium encoded with processing instructions for implementing a method for processing checks, the method comprising:

receiving check data that include an account identifier, a check identifier, and an amount of funds, the account identifier indicating a financial account and the check identifier indicating a check drawn on the financial account;

making the amount of funds unavailable for use in the financial account;

generating a code that indicates the check;

transmitting the code;

receiving a signal indicating clearance of a check, the signal further representing the check identifier, the account identifier and a first amount of funds;

determining, based on the account identifier and the check identifier, a second amount of funds that is unavailable for use in the financial account;

determining whether the first amount of funds is not greater than the second amount of funds; and making the second amount of funds available for use in the financial account if the first amount of funds is not greater than the second amount of funds.

34. An apparatus for processing checks, comprising:

a storage device; and a processor connected to the storage device, the storage device storing a program for controlling the processor; and the processor operative with the program to:
    receive a code;
    determine check data based on the code, the check data including a check identifier that indicates a check drawn on a financial account;
    determine whether the check has been claimed; and
    transmit a message indicating whether the check has been claimed.

35. A computer readable medium encoded with processing instructions for implementing a method for processing checks, the method comprising:

receiving a code; determining check data based on the code, the check data including a check identifier that indicates a check drawn on a financial account; determining whether the check has been claimed; and transmitting a message indicating whether the check has been claimed.

\* \* \* \* \*